SEQUENCE DETECTION CIRCUIT

Filed March 16, 1965 2 Sheets-Sheet 1

INVENTORS
JOHN L. PETERSON
JOHN C. TIRRELL
BY R C Terry
ATTORNEY

SEQUENCE DETECTION CIRCUIT

Filed March 16, 1965 2 Sheets-Sheet 2

United States Patent Office 3,345,615
Patented Oct. 3, 1967

3,345,615
SEQUENCE DETECTION CIRCUIT

John L. Peterson, Chicago, and John C. Tirrell, Mount Prospect, Ill., assignors to Teletype Corporation, Skokie, Ill., a corporation of Delaware Filed Mar. 16, 1965, Ser. No. 440,245
7 Claims. (Cl. 340—172.5)

This invention relates to a character sequence detector and, more specifically to a character sequence detector for detecting any predetermined sequence of characters including a sequence in which all of the characters are the same. Numerous applications for detecting predetermined sequences of characters exist in the transmission of data in binary form. These sequences generally signify specific functions to be performed or recognized by the receiving equipment and usually are comprised of two or more characters.

Prior art sequence detectors are known for providing an output indication following a predetermined sequence in which no two consecutive characters of the sequence are the same. When only a limited number of characters are available for use in designating certain functions, such as station addresses in a telegraph system, this restriction of limiting the sequences to those in which no two successive characters are the same severely limits the number of sequences which may be obtained from a given number of available characters.

Accordingly, it is an object of this invention to provide a sequence detector capable of detecting any desired sequence of signals or characters, including a sequence in which any sucessive characters of the sequence may be the same.

It is a further object of this invention to detect any desired sequence of signals or characters and to provide an output indication of a sequence only for each complete independent sequence received.

In accordance with a preferred embodiment of this invention a plurality of AND-gates programmed to respond to particular characters of the sequence of characters to be detected are provided with the output of each AND-gate being utilized to prime the "set" input of a corresponding binary device. The binary devices are equal in number to the number of characters in the sequence to be detected and are interconnected in a modified shift register circuit. A source of clock pulses is applied to the "reset" inputs of the binary devices and to both the reset and set inputs of the first binary device in the sequence.

When the first character in the sequence is detected by the AND-gate connected to prime the set input of the first binary device, the next clock or shift pulse causes the first binary device to be driven to its set state. The next clock pulse then causes the first binary device to be driven to its reset state causing an output pulse to be applied from that binary device to the second binary device in the sequence to drive the second binary device to its set state provided that binary device is primed by the output of the AND-gate corresponding to the second character of the sequence. Thus, the second binary device is in its set state after receipt of the second character of the sequence, and all the other binary devices are in the reset state. At the time the third character of the sequence is detected, the third binary device is driven to set state in a manner similar to that described above in setting the second binary device. This operation is repeated for as many characters as there are in the sequence of characters with the output of the final binary device in the register indicating that a completed sequence has been received.

If at any time in the operation of the system a character other than the next character of the sequence occurs, the corresponding binary device will not be primed, so that it will not be set by the output of the preceding state. This results in the entire register being cleared, which is its orignal state prior to the receipt of any signals. Thus, whenever the sequence is broken, it is necessary to start over with a new sequence; and no erroneous output is obtained from the detection circuit.

In order to enable the detector to detect sequences in which consecutive characters of the sequence are the same, a coincidence gate is provided for each of the binary devices except the first and last binary device in the sequence or register, with each of the coincidence gates providing an output signal upon coincidence of the set output of its corresponding binary device and the priming signal obtained from the character detecting AND-gate connected to the next succeeding binary device in the sequence. So long as an output is obtained from any of these coincidence gates, the priming signals for the first binary device are blocked so that it is rendered nonresponsive to the output of its corresponding character decoding AND-gate.

An addition gating circuit responsive to the set output of the first binary device and the output of the first and second output decoding gates is provided for applying a reset priming signal to the first binary device when the first binary device is in its set state and any character occurs except a repeat of the first character of the sequence when that character differs from the second character of the sequence. If the first and second characters of the sequence are the same, this additional gating circuit allows a reset priming signal to be applied to the first binary device when the second character of the sequence is received.

Further objects and features of this invention will become apparent to those skilled in the art upon consideration of the following detailed description taken in conjunction with the drawings in which.

Figure 1:
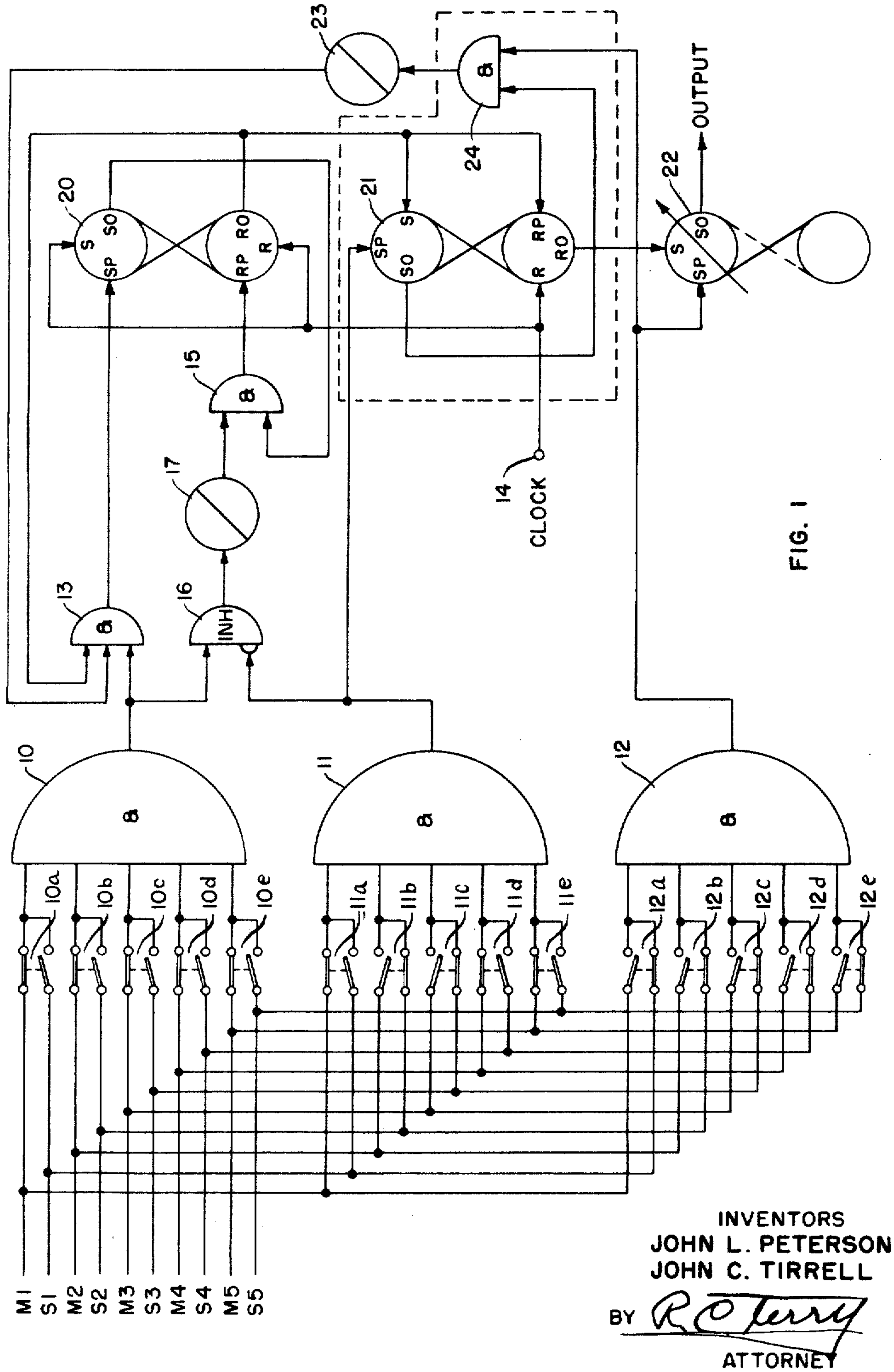
FIG. 1 is a schematic diagram of a preferred embodiment of the invention.

Referring now to FIG. 1 there is shown a three-character sequence detection circuit utilizing three AND-gates 10, 11 and 12 to detect the three characters of the sequence. For purposes of illustration, the characters to be detected may be considered to be encoded in the standard 5-level Baudot code commonly used in telegraph systems. As is well known, this code consists of permutations of five binary bits for each character. The two states each bit may attain are commonly referred to as "mark" and "space." The input to the circuit shown in FIG. 1 may be obtained from any suitable source and preferably is obtained from a telegraph receiving distributor. Such a distributor may provide a pair of output leads for each level of the code, one of these leads corresponding to a mark output (M) and the other corresponding to a space output (S) for that level. Such a series of leads is shown in FIG. 1 with the leads being identified as M1, S1 through M5, S5. Depending upon the particular character in the receiving distributor at any given time, various permutations of these leads will be energized with one or the other of the leads of each pair (for example, M1, S1) being energized for any given character.

Each of the AND-gates 10 through 12 is programmed to respond to a particular permutation of the outputs available on the leads M1, S1 through M5, S5 by suitable arrangement of a plurality of programming switches 10*a* through 10*e*, 11*a* through 11*e*, and 12*a* through 12*e*. The switches for programming each of the gates 10 through 12 may be set to cause the gates to each to be responsive to a different character or to cause any two of the gates to be responsive to the same character or to cause all three of the gates to be responsive to the same character. There is no restriction placed on the particular character which may be detected by any one of the gates 10, 11, or 12.

Associated with each of the gates 10, 11 and 12 is a corresponding binary device being shown in the preferred embodiment with a bistable flip-flop 20 associated with the AND-gate 10, a bistable flip-flop 21 associated with the AND-gate 11 and a monostable multivibrator 22 associated with the AND-gate 12. The flip-flops 20 and 21 preferably are of the type shown in the copending application to F. D. Biggam, Ser. No. 310,344, filed Sept. 20, 1963. This type of flip-flop requires a priming signal which must be present prior to the receipt of a trigger pulse before the flip-flop will respond to that trigger pulse. Thus, a set priming signal must be present before a set trigger pulse will be passed to drive the flip-flop to its set state. In a like manner a reset priming signal must be present before a reset trigger pulse will drive the flip-flop to its reset state.

Prior to the receipt of any signal sequence, the flip-flops 20 and 21 and the monostable multivibrator 22 all are in their reset condition with a positive output signal being obtained from the reset output (RO) of the flip-flops 20 and 21 and a negative output signal being obtained from the set outputs (SO) of the flip-flops 20 and 21 and the monostable multivibrator 22. It should be noted that the terms "positive" and "negative" are used herein merely as relative terms; and that where a positive signal is referred to, the actual potential at the output of the flip-flop could be ground, with the negative potential referred to being −6 volts. Conversely, the negative potential could be ground with the positive potential being +6 volts.

With the circuit in its reset condition assume that the sequence of characters to be detected is applied to the leads M1, S1 through M5, S5. For purposes of illustration assume that this sequence is one in which the three characters are dissimilar, for example, the sequence ABC. The gate 10 then is programmed by the switches 10*a*–10*e* to detect the character A, the gate 11 is programmed by the switches 11*a*–11*e* to detect the character B, and the gate 12 is programmed by the switches 12*a*–12*e* to detect the character C. The normal output of each of the gates 10, 11 and 12 is negative when the gates have any character applied to them except the one particular character to which the gate is programmed to recognize. When the first character is applied in parallel to the leads M1, S1 through M5, S5 corresponding to that character, it is recognized by the AND-gate 10 which applies a positive output pulse to an AND-gate 13. Two other inputs to the AND-gate 13 are obtained from the reset output (RO) of the flip-flop 20 and the output of an inverter 23. At the same time, the outputs of the gates 11 and 12 are negative.

Since the register comprising the binary elements 20 through 22 is in a clear or reset condition at this time, a positive output signal is obtained from the reset output (RO) of the flip-flop 20; and a positive output signal also is obtained from the output of the inverter 23 in a manner which will be more fully explained hereinafter. As a consequence, the positive output from the AND-gate 10 is passed by the AND-gate 13, since all three of its inputs at this time are positive; and the output from the AND-gate 13 is applied to the set priming input (SP) of the flip-flop 20.

A source of clock pulses synchronized with the external signals supplied to the leads M1, S1 through M5, S5 is utilized to supply pulses, one for each character, to an input terminal 14. These clock pulses are applied to the reset inputs (R) of the flip-flops 20 and 21 and also to the set input (S) of the flip-flop 20. Each pulse applied to the terminal 14 occurs shortly after and during the time each character is detected by the AND-gates 10 through 12. The first pulse applied as a positive transition to the set input (S) of the flip-flop 20 drives that flip-flop to its set state since its set priming input (SP) is primed by the output of the AND-gate 13. The clock pulse applied to the reset input (R) of the flip-flop 20 has no effect at this time since the reset priming input (RP) is not primed.

It should be noted that the flip-flop 21 will be driven by the first clock pulse to its reset state if it is not already in that state, since the reset output (RO) of the flip-flop 20 is applied to the reset prime input (RP) of the flip-flop 21 at the time the first clock pulse is applied to the terminal 14. When the flip-flop 20 is driven to its set condition, its reset output (RO) becomes negative and its set output (SO) becomes positive, with the result that the AND-gate 13 no longer will pass any signals obtained from the output of the AND-gate 10. At the same time an AND-gate 15 is primed by the positive output obtained from the set output (SO) of the flip-flop 20.

The next character B then is received (and in the example given this character is detected only by the AND-gate 11) and causes a positive output signal to be obtained from the AND-gate 11. At this time, the output of the AND-gate 10 is negative and is applied to the input of an inhibit gate 16. The output of the AND-gate 11 is positive and is applied to the inhibit input of the inhibit gate 16. The output of the inhibit gate 16 remains negative at this time since this output does not become positive unless the input from the AND-gate 10 is positive and the input from the AND-gate 11 is negative. An inverter 17 changes the negative output of the inhibit gate 16 to a positive signal which is applied to the second input of the AND-gate 15. As stated previously, the other input to the AND-gate 15, obtained from the set output (SO) of the flip-flop 20, is positive at this time. As a consequence, the output of the AND-gate 15 is positive and primes the reset priming input (RP) of the flip-flop 20.

Following detection of this second character, the second clock pulse is applied to the terminal 14 and the leading edge (positive transition) of this pulse again has no effect upon the flip-flop 21, but causes the flip-flop 20 to be reset since the reset prime input (RP) of the flip-flop 20 receives a positive output signal from the AND-gate 15 at this time. The change of state of flip-flop 20 from the set condition to the reset condition causes a positive output pulse to be applied to the set input (S) of the flip-flop 21 and a positive signal to be applied to the reset prime (RP) input of the flip-flop 21. The positive pulse applied to the set input (S) of the flip-flop 21 causes that flip-flop to be driven to its set condition since the output of the AND-gate 11 is priming the set priming input (SP) indicating the presence of the second character in the sequence. Thus, the condition of the circuit after detection of the second character is the flip-flop 20 in its reset condition, the flip-flop 21 in its set condition, and the one-shot multivibrator 22 remaining in its original reset condition.

When the third character C of the sequence next appears, it is detected only by the AND-gate 12 which applies a positive signal to the set prime input (SP) of the monostable multivibrator 22 and also applies a positive signal to an AND-gate 24. The other input to the gate 24 is obtained from the set output (SO) of the flip-flop 21, this output being positive at the time of the receipt of the third character in the sequence since the flip-flop 21 is in its set condition. As a consequence, the output of the AND-gate 24 is positive at this time; and the inverter 23 changes this positive signal to a negative signal which is applied to the AND-gate 13 to prevent any signal from being passed by the AND-gate 13. In a sequence of three dissimilar characters this operation has no effect upon the operation of the circuit since no output is obtained from the AND-gate 10 except upon receipt of the first character in the sequence.

When the next clock pulse is applied to the terminal 14, the flip-flop 21 is reset since its reset input (RP) is primed by the reset output (RO) of the flip-flop 20. A positive pulse then is obtained from the reset output (RO) of the flip-flop 21, and this pulse is applied to the set input (S) of the monostable multivibrator 22 to trigger the monostable multivibrator. The output (SO) of the monostable multivibrator 22 then indicates that the desired three character sequence was received.

It should be noted that if any character occurs out of sequence in place of the next character of the sequence, all of the stages 20 to 22 of the circuit are reset by the next clock pulse since none of the set inputs of the stages then are primed by an output from the appropriate next succeeding AND-gate 10, 11 or 12. Thus, any time the sequence fails, the entire circuit is reset awaiting the beginning of a new proper sequence. Following such a reset of the circuit and following the termination of the input signal to the AND-gate 24, the register is in its initial condition with positive inputs being applied to the AND-gate 13 from the reset output (RO) of the flip-flop 20 and from the output of the inverter 23, since the inverter 23 now changes the negative output of the AND-gate 24 to a positive signal. The circuit then is ready to detect another three character sequence.

When the first two characters of the sequence to be detected are identical with a different third character, for example, the sequence "AAB," the first character is detected in the same manner as stated previously and causes the flip-flop 20 to be placed in its set condition. The AND-gate 11 also detects the first character and applies a priming signal to the set prime input (SP) of the flip-flop 21. The signal is ineffective, however, since no positive transition is applied to the set input (S) of the flip-flop 21 during the time that the first character is being detected by the AND-gates 10 and 11. If the next character received is identical to the first character, both the AND-gates 10 and 11 detect this second character and provide a positive output signal. The output of the AND-gate 10, however, is not passed by the AND-gate 13 at this time since the flip-flop 20 is in its set condition causing a negative output signal to be applied to the AND-gate 13 from the reset output (RO) of the flip-flop 20. As a consequence, the next clock pulse applied to the set input of the flip-flop 20 has no effect at this input.

The AND-gate 11, at the same time, causes a positive output signal to be applied to the inhibit input of the inhibit gate 16. The positive signal obtained from the AND-gate 10, therefore, is not passed by the inhibit gate 16 and the output of the inhibit gate 16 is negative. This negative output is inverted by the inverter 17 to cause a positive signal to be applied to the input of the AND-gate 15. At the same time, the set output (SO) of the flip-flop 20 causes the other input of the AND-gate 15 to be positive which results in a positive output signal being applied to the reset prime input (RP) of the flip-flop 20 from the AND-gate 15. As a consequence, the next clock pulse causes the flip-flop 20 to reset and the flip-flop 21 to be set in the same manner as occurred for the operation of the circuit when all three characters to be detected were dissimilar. Upon detection of the third character, the monostable multivibrator 22 is triggered to its set condition when the third clock pulse resets the flip-flop 21 in the same manner as discussed previously in conjunction with the three character sequence wherein all of the characters were different.

If all three characters to be recognized are identical, the receipt of the first two characters will cause the circuit to operate in the same manner as discussed above for the sequence "AAB." Receipt of the third character is recognized by all three AND-gates 10, 11 and 12 and causes a positive output signal to be obtained from each of them. The positive output signal from the AND-gate 10 is not passed by the AND-gate 13 since the output from the inverter 23 is negative at this time. As stated previously, this results from the fact that the AND-gate 24 has a positive signal applied to it from the set output (SO) of the flip-flop 21. (This flip-flop being set by receipt of the second character in the sequence) and a second positive signal applied to it from the output of the AND-gate 12. This causes the output of the AND-gate 24 to be positive and the inverter changes this signal to a negative signal which is applied to the AND-gate 13 causing that gate to block the passage of the output of the AND-gate 10.

When the next clock pulse is received, the flip-flop 21 is reset and causes the monostable multivibrator 22 to be driven to its set condition, as described previously, causing an output signal to be obtained from the multivibrator 22 indicating the desired three identical character sequence has been received.

It is to be noted that if the third character is dissimilar from the first or second characters the circuit will function in precisely the same manner as described previously, except that the AND-gate 24 and the inverter 23 would not be necessary to prevent the output of the AND-gate 10 from the priming the set prime input (SP) of the flip-flop 20. However, any time that the first and third characters may be identical, the AND-gate 24 and the inverter 23 must be provided to prevent the setting of the flip-flop 20 prior to the completion of the current sequence. For example, if the sequence to be detected is ABA and the signal train received is ABABABA, an output is obtained from the circuit shown in FIG. 1 only after the second A and the final A of the illustrated sequence. If the AND-gate 24 and the inverter 23 were eliminated, an output signal would occur for each A from the second A on, that is the first output would be obtained after the sequence ABA, the second output would be obtained after the next two letters BA had been received and a third output would be obtained after the final A in the sequence. The AND-gate 24 and inverter 23 cause the circuit to provide an output only after each complete independent sequence, and no character forming a part of one sequence can be a part of any other sequence.

The inhibit gate 16, inverter 17, and the AND-gate 15 prevent the resetting of the flip-flop 20 when a sequence of dissimilar characters is being sought and a series of characters similar to the first character is received. Assume that it is desired to detect the sequence ABC and the input signal train is AAAABC. Therefore, in response to the first A of the sequence, the flip-flop 20 will switch to the set state in the manner previously described. The set output of the flip-flop 20 then becomes positive and is applied to the AND-gate 15.

Upon receipt of the next character A, a positive output signal is obtained from the AND-gate 10 as was obtained for the first character A. This positive signal is passed by the inhibit gate 16 since the output of the AND-gate 11 is negative at this time because it is not programmed to detect the character A, The positive output signal of the inhibit gate 16 is changed to a negative signal by the inverter 17 and this negative signal is applied to the other input of the AND-gate 15, the output of which, therefore, remain negative. The negative signal obtained from the AND-gate 15 is applied to the reset prime input (RP) of the flip-flop 20 and prevents the clock pulse applied to the terminal 14 from resetting the flip-flop 20. This operation is repeated for each successive character A received in the example given.

As soon as the second character to be recognized in the sequence is received or any other character not in the sequence occurs, the output of the inhibit gate 16 becomes negative, is changed to a positive signal by the inverter 17 and is passed by the AND-gate 15; so that the next pulse applied to the terminal 14 resets the flip-flop 20. The rest of the sequence is detected as previously described.

Figure 2:
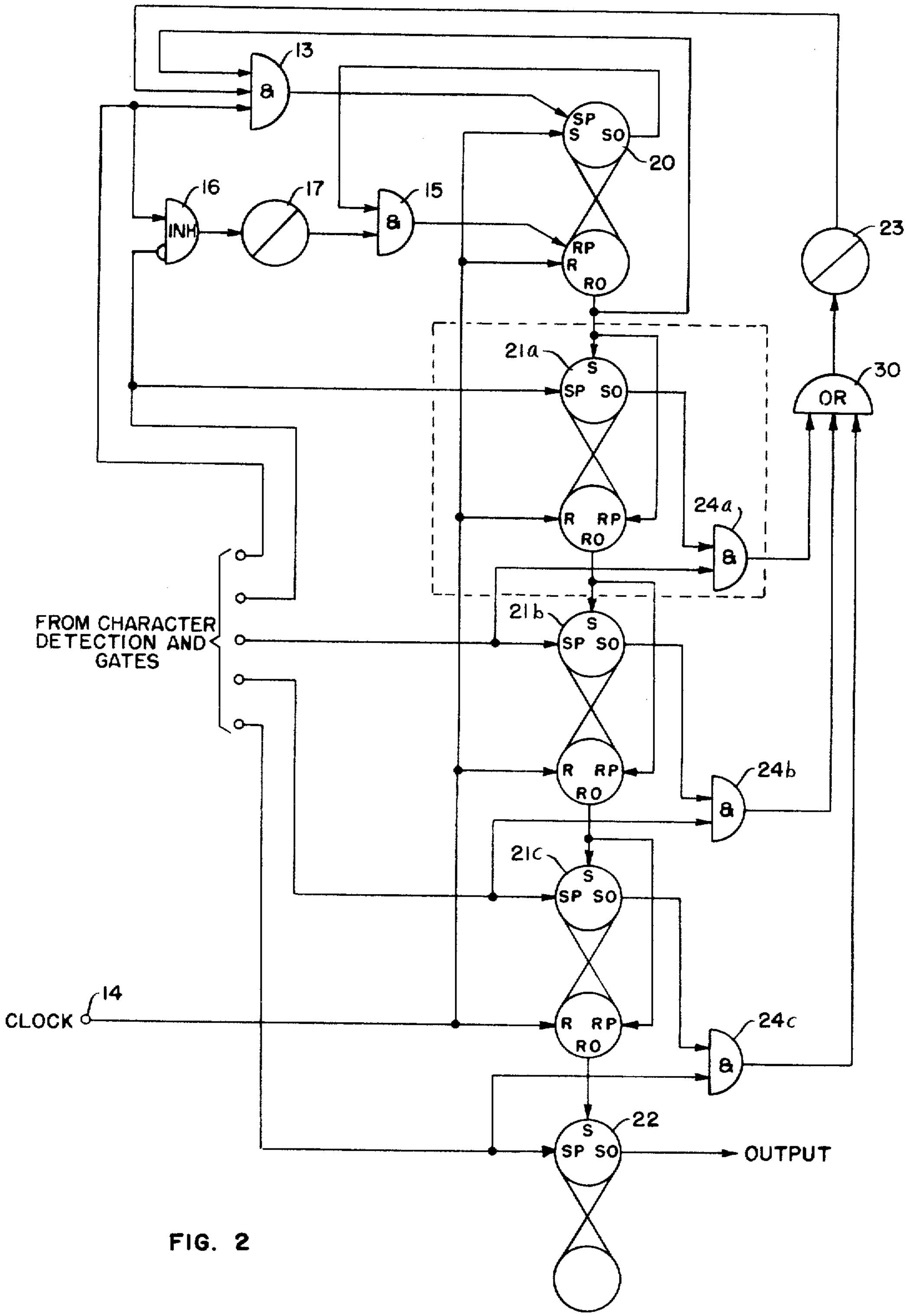
FIG. 2 is a schematic diagram illustrating the manner in which the sequence detection circuit of FIG. 1 may be expanded to detect any desired number of sequential characters.

Referring now to FIG. 2 there is shown a sequence detection circuit utilizing the principles shown in the circuit in FIG. 1 but expanded to detect any predetermined sequence of five characters. The circuit shown in FIG. 2 is similar in all respects to that of FIG. 1, the only difference being the addition of two character detection AND-gates (indicated but not shown) and the addition of a stage, identical to that shown in the dotted lines in FIG. 1, to accommodate each extra character in the sequence to be detected.

In FIG. 2 all of the elements which are similar to those shown in FIG. 1 have been given the same reference numerals with the additional stages being identified by the lower case "*a*," "*b*," and "*c*" following the reference numerals used in FIG. 1 for comparable components. The operation of the circuit shown in FIG. 2 is identical to that shown in FIG. 1 with the exception of the addition of an OR-gate 30 connected to the output of the AND-gates 24*a*, 24*b* and 24*c* which are comparable to the AND-gate 24 in FIG. 1. So long as a positive output signal is obtained from any of the AND-gates 24*a* through 24*c*, it is passed by the OR-gate 30 and inverted by the inverter 23 which causes a negative signal to be applied to the AND-gate 13; so that the flip-flop 20 will not be set by any character until the entire sequence has been detected.

The operation of the circuit shown in FIG. 2 is identical in all other respects of the circuit shown in FIG. 1 and illustrates the manner in which the circuit shown in FIG. 1 may be expanded to any desired number of stages for the detection of any sequence of characters three or more characters in length.

It should be noted that if the circuit is to be used to detect only sequences in which all of the characters are the same, the character detection AND-gates 10, 11 and 12 may be replaced with a single AND-gate having its output supplied to all stages of the register. Similarly, any time two or more characters of the sequence are the same, a single AND-gate may be used to detect them, with the output of the gate being connected to the appropriate stages of the register.

The monostable multivibrator 22 could be replaced by a flip-flop if so desired. To do this it would be necessary to connect the reset output (RO) of the preceding flip-flop 21 to the set input (S) and the reset prime input (RP) of the flip-flop. Then the reset input (R) would be supplied with clock pulses supplied to the terminal 14 and the set input (S) would be connected to the output of the AND-gate 12. This final flip-flop then would be set in the same manner used to trigger the monostable multivibrator 22 and would be reset by the next succeeding clock pulse. Although a particular embodiment of the invention is shown in the drawing and is described in the foregoing specification it is to be understood that the invention is not limited to that specific embodiment chosen merely for purposes of disclosure, but that it covers all changes and modifications which do not depart from the true scope of the invention.

What is claimed is:

1. A system for detecting any predetermined sequence of signals at a signal source including:

a plurality of binary devices having a set state and a reset state arranged in sequence and equal in number to the number of signals in the sequence to be detected, means responsive to the signals in the sequence to be detected for applying priming signals to the repective binary devices, a source of clock pulses, means for applying the clock pulses to predetermined ones of the binary devices to drive any binary device in a set state from its set state to a reset state whenever the preceding binary device is in its reset state, means responsive to the output pulse obtained when a binary device changes from a set state to a reset state for driving the next succeeding binary device in the sequence to its set state if that binary device has a priming signal applied to it from the signal responsive means at the time the output pulse occurs, first gating means responsive to the outputs of predetermined ones of the signal responsive means combined with the set state outputs of predetermined ones of the binary devices for providing an output signal whenever one of the predetermined binary devices is in its set state at the time the signal responsive means for the next succeeding signal detects a signal in the predetermined sequence of signals, and second gating means responsive to the output of the first gating means and the reset state output of the first binary device in the sequence of binary devices for passing the priming signals from the signal responsive means to the first binary device only when the first binary device is in its reset state and no output signal is obtained from the first gating means.

2. A system for detecting any predetermined sequence of signals at a signal source including:

a plurality of binary devices each having a set and a reset input and a set and a reset output, the binary devices being arranged in sequence corresponding to the sequence of signals to be detected;

means responsive to the signals at the signal source for priming the set inputs of the respective binary devices;

means for connecting the reset output of each of the binary devices to the set input of the next succeeding binary device;

means for connecting the reset output of each of the binary devices to prime the reset input of the next succeeding binary device;

a source of clock pulses;

means for applying the clock pulses to the reset inputs of all the binary devices and to the set input of the first binary device in the sequence;

first gating means responsive to the outputs of predetermined ones of the signal responsive means combined with the set outputs of predetermined ones of the binary devices for providing an output signal whenever one of the predetermined binary devices has a set output at the time the signal responsive means is priming the set input of the next succeeding binary device;

an inverter connected to the output of the first gating means; and second gating means responsive to the output of the inverter and the reset output of the first binary device in the sequence of binary devices for passing the priming signals from the signal responsive means to the set input of the first binary device only when the first binary device is in its reset state and no output signal is obtained from the first gating means.

3. A system according to claim 2 wherein the final binary device in the sequence of binary devices is a monostable multivibrator and the remainder of the binary devices are bistable multivibrators, with the clock pulses being applied only to the bistable multivibrators.

4. A system for detecting any predetermined sequence of signals at a signal source including:

a plurality of binary devices each having a set and a reset input and a set and a reset output, the binary devices being arranged in sequence corresponding to the sequence of signals to be detected;

means responsive to the signals at the signal source for priming the set inputs of the respective binary devices;

means for connecting the reset output of each of the binary devices to the set input of the next succeeding binary device, means for connecting the reset output of each of the binary devices to prime the reset input of the next succeeding binary device;

a source of clock pulses;

means for applying the clock pulses to the reset inputs of all the binary devices and to the set input of the first binary device in the sequence;

a coincidence gate for each of the binary devices except the first and last binary devices in the sequence of binary devices, each of the coincidence gates providing an output signal upon coincidence of the set output of the corresponding binary device and the priming signal obtained from the signal responsive means connected to the next succeeding binary device in the sequence;

an OR-gate responsive to the outputs of the coincidence gates;

an inverter connected to the output of the OR-gate;

a further coincidence gate responsive to the output of the inverter, the reset output of the first binary device in the sequence of binary devices, and the output of the signal responsive means, for priming the set input of the first binary device only when the first binary device is in its reset condition and no output is obtained from the OR-gate.

5. A system for detecting any predetermined sequence of signals at a signal source including:

a plrality of binary devices each having a set and reset priming input, a set and a reset input, and a set and a reset output, the binary devices being arranged in sequence corresponding to the sequence of signals to be detected;

means individually responsive to the signals at the signal source for priming the set inputs of the respective binary devices;

means for connecting the reset output of each of the binary devices to the set input of the next succeeding binary device;

means for connecting the reset output of each of the binary devices to prime the reset input of the next succeeding binary device;

a source of clock pulses;

means for applying the clock pulses to the reset inputs of all the binary devices and to the set input of the first binary device in the sequence;

a coincidence gate for each of the binary devices except the first and last binary devices in the sequence of binary devices, each of the coincidence gates providing an output signal upon coincidence of the set output of the corresponding binary device and the priming signal obtained from the signal responsive means connected to the next succeeding binary device in the sequence;

an OR-gate responsive to the outputs of the coincidence gates;

an inverter connected to the output of the OR-gate;

a further coincidence gate responsive to the output of the inverter, the reset output of the first binary device in the sequence of binary devices, and the output of the signal responsive means for priming the set input of the first binary device only when the first binary device is in its reset condition and no output is obtained from the OR-gate; and means responsive to the set output of the first binary device and predetermined outputs of the signal responsive means for providing a reset priming signal to the first binary device.

6. A system for detecting any predetermined sequence of signals at a signal source including:

a plurality of binary devices each having a set and a reset input and a set and reset output, the binary devices being arranged in sequence corresponding to the sequence of signals to be detected;

means individually responsive to the signals at the signal source for priming the set inputs of the respective binary devices;

means for connecting the reset output of each of the binary devices to the set input of the next succeeding binary device;

means for connecting the reset output of each of the binary devices to prime the reset input of the next succeeding binary device;

a source of clock pulses;

means for applying a clock pulse to the reset inputs of all the binary devices and to the set input of the first binary device in the sequence after receipt of each signal at the signal source;

a coincidence gate for each of the binary devices except the first and last binary devices in the sequence of binary devices, each of the coincidence gates providing an output signal upon coincidence of the set output of its corresponding binary device and the priming signal obtained from the signal responsive means connected to the next succeeding binary device in the sequence;

an OR-gate responsive to the outputs of the coincidence gates;

a first inverter connected to the output of the OR-gate;

a further coincidence gate responsive to the output of the first inverter, the reset output of the first binary device in the sequence of binary devices, and the output of the signal responsive means for priming the set input of the first binary device only when the first binary device is in its reset condition and no output is obtained from the OR-gate;

third gating means responsive to the outputs of the signal responsive means for detecting the first two signals in the predetermined sequence of signals for providing an output signal only when the first signal responsive means detects a signal and the second signal responsive means does not detect the signal;

a second inverter for inverting the output of the third gating means; and fourth coincidence gating means responsive to the output of the second inverter and the set output of the first binary device for providing a reset priming signal to the first binary device.

7. A system according to claim 6 wherein the final binary device in the sequence of binary devices is a monostable multivibrator having a set input and a set output only and the remainder of the binary devices are bistable multivibrators, with the clock pulses being applied only to the bistable multivibrators.

References Cited

UNITED STATES PATENTS

| | | | |
|---|---|---|---|
| 2,430,447 | 11/1947 | Branson | 178—4 |
| 2,766,318 | 10/1956 | Bacon | 178—2 |
| 2,858,429 | 10/1958 | Heywood | 328—49 |
| 2,941,191 | 6/1960 | Tyrlick | 340—174 |
| 3,056,116 | 9/1962 | Crane | 340—174 |

ROBERT C. BAILEY, *Primary Examiner.*

I. S. KAVRUKOV, *Assistant Examiner.*